US010055620B2

(12) United States Patent
Bruce et al.

(10) Patent No.: US 10,055,620 B2
(45) Date of Patent: Aug. 21, 2018

(54) BAGGAGE HANDLING (71) Applicant: INTERNATIONAL BUSINESS MACHINES CORPORATION, Armonk, NY (US)

(72) Inventors: Edwin J. Bruce, Corinth, TX (US); Stephanie B. McCaffrey, Farmers Branch, TX (US); Cynthia A. O'Shea, Southlake, TX (US); Tassanee K. Supakkul, Euless, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/406,097

(22) Filed: Jan. 13, 2017

(65) Prior Publication Data
US 2018/0204030 A1  Jul. 19, 2018

(51) Int. Cl.
  *G06K 7/10* (2006.01)
  *G06K 19/077* (2006.01)
  *G07B 15/02* (2011.01)

(52) U.S. Cl.
  CPC ... *G06K 7/10366* (2013.01); *G06K 19/07758* (2013.01)

(58) Field of Classification Search
  CPC .................. G06K 7/10366; G06K 19/07758
  (Continued)

(56) References Cited

U.S. PATENT DOCUMENTS 3,610,159 A * 10/1971 Fickenscher ............ B64F 1/368
  104/88.05

3,695,462 A * 10/1972 Sullivan .................. B64F 1/366
  198/350

(Continued)

FOREIGN PATENT DOCUMENTS

EP   1890256 A1 *  2/2008 ............. G06Q 10/00
WO  2014161556       10/2014

OTHER PUBLICATIONS

Ledbetter, Carly; U.S. Airlines Made More Than $6.5 Billion in Baggage and Reservation Fees in 2014; The Huffington Post; May 7, 2015; 5 pages.

(Continued)

*Primary Examiner* — Claude J Brown
(74) *Attorney, Agent, or Firm* — Schmeiser, Olsen & Watts; Daniel R. Simek (57) ABSTRACT

Systems, methods and tools for transporting and monitoring baggage by leveraging hardware and software based techniques to schedule time slots for the arrival of the baggage at pre-scheduled waypoints or final destinations. Computer systems manage route scheduling, baggage transportation, tracking and verification using a multi-tiered architecture to ensure each bag arrives at the scheduled waypoints and final destination. Baggage security includes tracking, via one or more chaperone devices and/or tagging the baggage using active or passive tagging systems. Tracking baggage allows the system to identify exceptions in the routing pattern of the baggage before the error may be realized by employees of the transportation service or the customer arriving at the final destination. Identifying exceptions to the routing pattern sooner may increase the likelihood of successfully backtracking to the last known whereabouts of the baggage and re-routing the baggage to the final destination in a timely manner.

20 Claims, 5 Drawing Sheets

(58) Field of Classification Search
USPC .......................................................... 235/384
See application file for complete search history.

(56) References Cited

U.S. PATENT DOCUMENTS

| | | | |
|---|---|---|---|
| 6,967,579 B1* | 11/2005 | Elizondo | B64F 1/368 |
| | | | 340/572.1 |
| 7,866,554 B2 | 1/2011 | Cash et al. | |
| 8,676,592 B2 | 3/2014 | Schoen et al. | |
| 8,902,059 B2 | 12/2014 | Mahmoud | |
| 2003/0189094 A1 | 10/2003 | Trabitz | |
| 2005/0246224 A1 | 11/2005 | McKanna et al. | |
| 2007/0119926 A1* | 5/2007 | Sloan | G06K 7/10445 |
| | | | 235/384 |
| 2008/0117025 A1* | 5/2008 | Tuttle | G06K 7/0008 |
| | | | 340/10.3 |
| 2010/0007500 A1* | 1/2010 | Mestres | G06Q 10/08 |
| | | | 340/572.4 |
| 2010/0207780 A1 | 8/2010 | Newton | |
| 2013/0234849 A1* | 9/2013 | Gupta | A45C 13/18 |
| | | | 340/539.11 |
| 2013/0241712 A1* | 9/2013 | Motley, III | G06K 19/0717 |
| | | | 340/10.51 |
| 2015/0029024 A1 | 1/2015 | Outwater et al. | |
| 2015/0029026 A1 | 1/2015 | Brandes et al. | |
| 2015/0122893 A1* | 5/2015 | Warther | G06K 7/10366 |
| | | | 235/492 |
| 2015/0360258 A1 | 12/2015 | Dadyala | |
| 2016/0042316 A1 | 2/2016 | Gates et al. | |
| 2016/0180288 A1 | 6/2016 | Sager et al. | |
| 2017/0004444 A1* | 1/2017 | Krasko | G06Q 10/0833 |

OTHER PUBLICATIONS

Ahmed, Tanvir et al.; Mining Risk Factors in RFID Baggage Tracking Data; 2015 16th IEEE International Conference on Mobile Data Management; Jun. 15-18, 2015; pp. 235-242.

Ghazal, Mohammed et al.; Towards Smart Wearable Real-time Airport Luggage Tracking; 2016 International Conference on Industrial Informatics and Computer Systems; Mar. 13-15, 2016; 6 pages.

* cited by examiner

BAGGAGE HANDLING

TECHNICAL FIELD

The present disclosure relates generally to systems, methods and tools for tracking, transporting, scheduling and delivering luggage.

BACKGROUND

Baggage handling and routing have long been error-prone enterprises in the transportation industry. The handling procedures and systems of buses, trains, cruise ships and commercial airlines strive to be on-time, accurate and dependable, especially in light of new policies that have been developed, charging passengers to check luggage with the transportation company. In response to having to pay an additional fee with most commercial transportation companies, customers are expecting the baggage services to perform with fewer errors and offer on-time delivery.

Currently, transportation companies have employed numerous types of baggage handling and transportation systems. Each of these systems offer varying degrees of success and adequacy for servicing the baggage of the customers using the transportation company. Handling luggage by the airline companies and other transportation companies face numerous problems, mostly due to human error, improper handling and the nature of the routing system. Errors occurring at any point in the system can cause luggage to be misrouted and can end up hundreds or even thousands of miles from its proper destination. Locating misrouted luggage in a timely fashion is important to overall customer satisfaction if an error does occur.

SUMMARY

A first embodiment of the present disclosure provides a method for transporting baggage comprising the steps of: creating, by a processor of a computer system, a baggage itinerary comprising a waypoint, a final destination and arrival times for the baggage at the waypoint and final destination; assigning, by the processor, a routing pattern to the baggage; further assigning, by the processor, the baggage to a baggage group comprising a chaperone device configured to escort the baggage to the waypoint or final destination; receiving, by the processor, location data of the baggage group from the chaperone device tracking the position and proximity of the baggage in relation to the chaperone device; and retrieving, by the processor, verification data from a verification system positioned at the waypoint or final destination, reporting an arrival or absence of the baggage.

A second embodiment of the present disclosure provides a computer system, comprising: a processor; a memory device coupled to the processor; and a computer readable storage device coupled to the processor, wherein the storage device contains program code executable by the CPU via the memory device to implement a method for transporting baggage comprising the steps of: creating, by the processor, a baggage itinerary comprising a waypoint, a final destination and arrival times for the baggage at the waypoint and final destination; assigning, by the processor, a routing pattern to the baggage; further assigning, by the processor, the baggage to a baggage group comprising a chaperone device configured to escort the baggage to the waypoint or final destination; receiving, by the processor, location data of the baggage group from the chaperone device tracking the position and proximity of the baggage in relation to the chaperone device; and retrieving, by the processor, verification data from a verification system positioned at the waypoint or final destination, reporting an arrival or absence of the baggage.

A third embodiment of the present disclosure provides a computer program product comprising: one or more computer readable hardware storage devices having computer readable program code stored therein, said program code containing instructions executable by the one or more central processing units (CPU) to implement a method for transporting baggage comprising the steps of: creating, by a processor of a computer system, a baggage itinerary comprising a waypoint, a final destination and arrival times for the baggage at the waypoint and final destination; assigning, by the processor, a routing pattern to the baggage; further assigning, by the processor, the baggage to a baggage group comprising a chaperone device configured to escort the baggage to the waypoint or final destination; receiving, by the processor, location data of the baggage group from the chaperone device tracking the position and proximity of the baggage in relation to the chaperone device; and retrieving, by the processor, verification data from a verification system positioned at the waypoint or final destination, reporting an arrival or absence of the baggage.

DETAILED DESCRIPTION

Overview

Embodiments of the present disclosure recognize that the currently available systems and methods for transporting or tracking the baggage of customers using a commercial transportation company, such as an airline, train, cruise ship, etc., are imprecise and slow to respond errors. Currently available systems or methods rely heavily on the manual efforts of the transportation companies' employees to route baggage and manually position baggage in order to properly have the baggage arrive at the final destination. Currently available systems lack dynamic auditing systems for tracking the progress of baggage on the baggage's journey from waypoint to waypoint. Often, the available systems and methods rely on individual customers reporting the loss or mishandling of baggage to the transportation company. The loss or mishandling of the baggage is often only identified due to the lack of the baggage's arrival at the final destination alongside the baggage's respective owner. Currently available systems and methods lack the capability to continuously monitor baggage at each waypoint along the routing path or the ability to recognize the absence of baggage in a desired location at a scheduled waypoint prior to the discovery of the missing baggage by the owner.

Embodiments of the systems, methods and tools described in this application for transporting baggage improve upon currently available baggage transporting systems. The disclosed systems, methods and tools leverage both hardware and software based techniques to schedule time slots during the baggage routes between each waypoint and the final destination, including arrival times at the various waypoints along the scheduled routing pattern. Embodiments allow for the simultaneous monitoring of the baggage by baggage system as well as further allowing the customer to monitor the progress of the baggage. The disclosed embodiments may identify exceptions in the routing pattern before the error is realized by the employees of the transportation service or the customer at the final destination. Identifying exceptions to the routing pattern sooner may increase the likelihood of successfully backtracking to the last known whereabouts of the baggage and re-routing the baggage to the final destination in a timely manner.

Embodiments of the computer systems managing route scheduling as well as baggage transportation, tracking and verification may utilize a multi-tiered architecture to ensure each piece of baggage properly arrives at the waypoints and final destination as scheduled. The first layer of the architecture in some embodiments, allows for customers to track and monitor each step in the itinerary of the baggage's scheduled route. The customer, through the use of a client device, may receive the pre-planned itinerary which may include each waypoint the baggage intends to stop, the scheduled times of arrival and departure at each waypoint and visual evidence from the verification systems linked with the baggage monitoring system.

Additional layers of security in the multi-tiered architecture of the baggage transportation system may include baggage tracking, via one or more chaperone device and/or tagging the baggage using active or passive tagging systems to monitor the location of the baggage. For example, chaperone devices may monitor a particular group of luggage that may be assigned to the chaperone device via the baggage system's central computer system. The baggage may be placed into the detectable proximity of the chaperone device. The chaperone device may be assigned a pre-scheduled destination and an arrival time. Each piece of baggage assigned to the chaperone device's group may travel alongside or near the chaperone device through one or more legs of the chaperone device's journey. As the chaperone device moves from destination to destination, baggage may enter and leave the chaperone device's groups as scheduled.

While baggage is assigned to a particular chaperone, the chaperone device may monitor each piece of baggage being within the group. The chaperone device may be equipped with object recognition hardware such as cameras and sensors, along with recognition software to identify each piece of baggage and the locations of the baggage relative to the chaperone device. In some instances, the baggage may be tagged with active or passive RFID sensors and/or sensor beacons that may interact with the chaperone device and/or tag readers placed in the surrounding environment. If a piece of baggage is removed, separated or lost from the chaperone's group before the baggage is scheduled to change groups, the chaperone device may be capable of alerting the baggage system in a timely manner, increasing the likelihood of correcting the situation efficiently.

In addition to the chaperone devices and tagging devices, the baggage systems described herein may be further equipped with a verification system capable of tracking the baggage along the routing schedule prepared by the baggage system. The verification system may utilize hardware capable of visually verifying baggage entering and departing from each waypoint and/or the final destination of the baggage. The verification system may visually capture the presence of the baggage at a particular location using a camera system, scanners or receivers interacting with chaperone devices and/or the passive tags, active tags or beacons affixed to the baggage. The arrivals and departures of the baggage may be cross checked with the established itinerary and/or routing pattern designed by the baggage system, including the performance of verifications at the estimated times established in the itinerary. Baggage not arriving at a location of the itinerary at a scheduled time may be reported to a centralized monitoring system. The system may scan the last known locations of the baggage and the verifications systems monitoring the baggage to identify errors resulting in the mishandling of baggage and adjusting the route of the baggage in order to arrive at the final destination in a timely manner.

System for Transporting Baggage

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
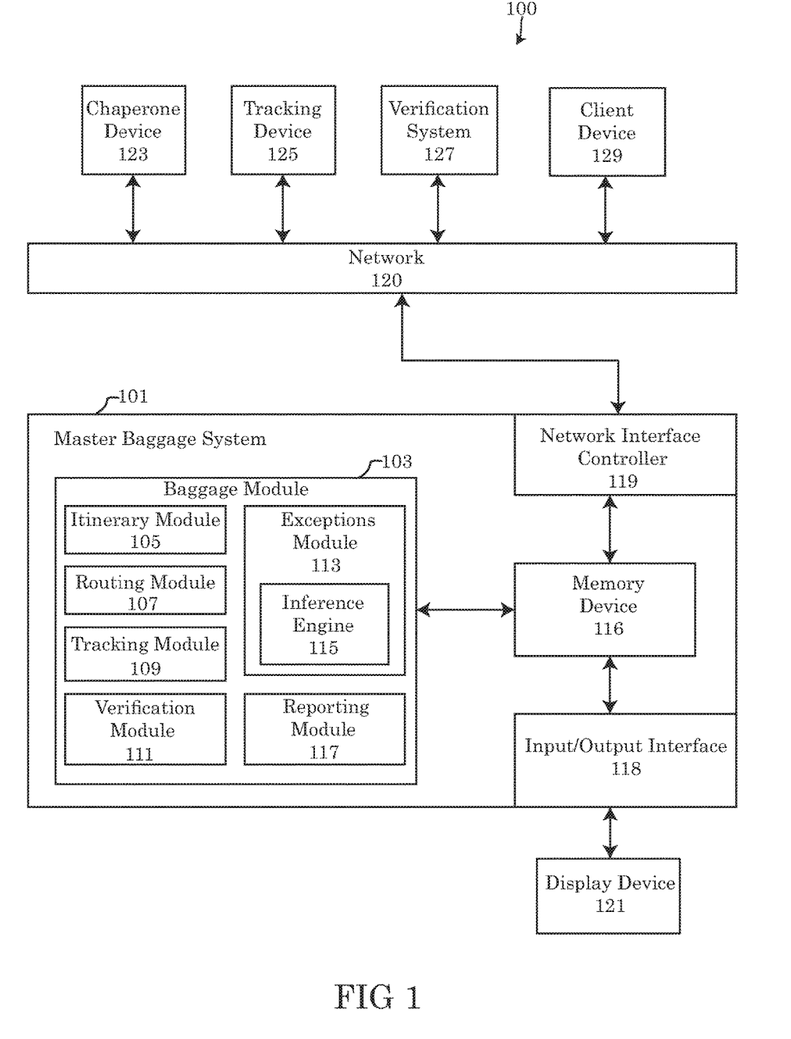
FIG. 1 depicts a schematic view of an embodiment of a system for transporting baggage consistent with the embodiments of the present disclosure.
Figure 5:
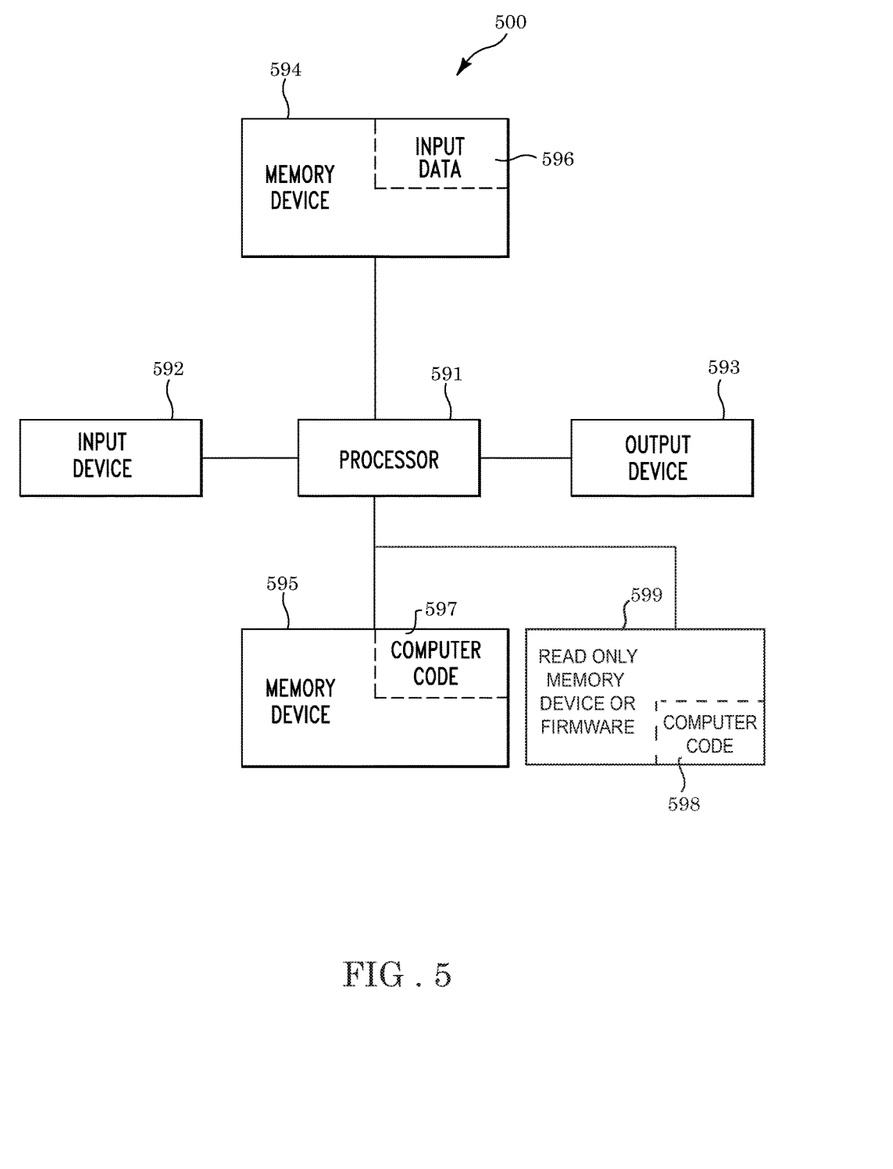
FIG. 5 depicts a block diagram of an embodiment of a generic computer system capable of implementing methods for transporting baggage consistent with the embodiments described in this application.

Referring to the drawings, FIG. 1 depicts a block diagram of a baggage transportation and monitoring system 100 (hereinafter "baggage system 100") for scheduling and tracking the movement, arrival, departure and mishandling of customer baggage. Embodiments of the baggage system 100 may include a plurality of one or more computer systems that may communicate with one another to perform each of the functions of the baggage system described herein. Various computer systems included within the baggage system 100 may include computer systems 101, 123, 125, 127, 129 and more particularly the computer systems may be identified as the master baggage system 101, chaperone device 123, tracking device 125, verification system 127 and client device 129. The computer systems 101, 123, 125, 127, 129 may each be a specialized computer system, having specialized configurations of hardware, software or a combination thereof as depicted in FIG. 1 of the present disclosure and in the embodiments described herein. Embodiments of the computer systems 101, 123, 125, 127, 129 may not only comprise the elements of the systems and devices depicted in FIG. 1, but may also incorporate one or more elements of a generic computer system 500 as shown in FIG. 5 and described in detail below. Elements of the generic computer system 500 of FIG. 5 may be integrated into the specialized computer systems 101, 123, 125, 127, 129 of FIG. 1.

Each of the computer systems 101, 123, 125, 127, 129 may be connected and placed in communication with one another over a computer network 120. Embodiments of the network 120 may be constructed using wired or wireless connections between each hardware component connected to the network 120. As shown in the exemplary embodiments, each of the computer systems 101, 123, 125, 127, 129 may connect to the network 120 and communicate over the network 120 using a network interface controller (NIC) 119 or other network communication device. Embodiments of the NIC 119 may implement specialized electronic circuitry allowing for communication using a specific physical layer and a data link layer standard such as Ethernet, Fiber channel, Wi-Fi or Token Ring. The NIC 119 may further allow for a full network protocol stack, enabling communication over network 120 to the group of computer systems or other computing hardware devices linked together through communication channels. The network 120 may facilitate communication and resource sharing among the computer systems 101, 123, 125, 127, 129 and additional hardware devices connected to the network 120, for example a network accessible repository or other network accessible data storage device connected to the network 120. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Embodiments of the baggage system 100 may include a master baggage system 101 which may be a centralized computer system responsible for creating baggage itineraries, routing schedules, assigning baggage groups, sending and receiving tracking information as well as verifying the locations of the baggage being monitored by the system 100. The embodiments of the master baggage system 101 may further identify exceptions occurring to each of the baggage itineraries; locate misplaced or mishandled baggage as a result of the exceptions and re-reroute baggage to the proper final destinations when exceptions to the scheduled itinerary occur. The master baggage system 101 may further report updates regarding the baggage location, itinerary schedules, verification data, exceptions and rerouting information to a customer's client device 129, allowing for customers to track updates to the status of the baggage as changes occur.

Embodiments of the master baggage system 101 may perform each of the tasks through a baggage module 103 which may be performed using specialized hardware incorporated into the system of the master baggage system 101 or program code loaded into the memory device 116 of the master baggage system (or network accessible memory device). The term "module" may refer to a hardware based module, software based module or a module may be a combination of hardware and software resources. A module (whether hardware, software, or a combination thereof) may be designed to implement or execute one or more particular functions, tasks or routines of the master baggage system 101. Embodiments of hardware based modules may include self-contained components such as chipsets, specialized circuitry and one or more memory devices. A software-based module may be part of a program code or linked to program code containing specific programmed instructions loaded in the memory device 116 of the master baggage system 101 or other specialized computer systems 123, 125, 127, 129 of the baggage system 100.

Embodiments of the baggage module 103, whether hardware, software or a combination thereof, may perform the functions and tasks associated with scheduling the baggage itinerary, routing the baggage to a final destination via one or more waypoints, assigning chaperone devices 123 to escort the baggage along the scheduled route, tracking the movement of the baggage along a scheduled route, verifying the baggage is meeting the scheduled itinerary times, identifying errors and other exceptions resulting in misplaced baggage handling, correcting the exceptions and reporting the status of the baggage to the customer. Embodiments of the baggage module 103 may include one or more sub-modules designated with performing the individual tasks, routines and services of the baggage module 103 and/or the master baggage system 101 as described throughout this application. Various embodiments of the baggage module 103 may comprise an itinerary module 105, routing module 107, tracking module 109, verification module 111, an exceptions module 113 which may comprise an inference engine 115, and a reporting module 117.

Embodiments of the itinerary module 105 may perform the routine or task of scheduling the delivery of baggage being provided by the customer to the commercial transportation company. For instance, upon arriving at a terminal or departure point, a customer traveling with baggage may deposit the baggage with the transportation company. Baggage information may be inputted into the master baggage system, and a profile may be created for the baggage in the itinerary module 105. The itinerary module 105 may link the baggage provided by the customer to the particular customer's ticket no. or traveling itinerary. In some embodiments, the customer may scan the customer's ticket comprising the ticketing information such as the time of departure, the final destination and the time of arrival by the customer at the final destination. The itinerary module 105, upon receiving customer information may create an itinerary for the baggage that matches the final destination of the customer and/or schedules the arrival time of the baggage at the final destination to the same (or nearly the same) time as the arrival of the customer. In some embodiments, upon inputting the baggage information into the baggage system 100, the itinerary module 105 may further create a unique identification number and assign the unique identification number to each piece of baggage. The unique identification number may allow for the customer and the baggage system 100 to query the master baggage system 101 for the status of the baggage during the customer's trip. Querying the unique identification number or customer information may allow the transportation company or the customer to periodically verify that the baggage is progressing toward the scheduled final destination.

The routing module 107 may operate closely with the itinerary module 105 to create a routing pattern for the baggage to follow in order to meet the scheduled arrival times of the itinerary. Embodiments of the routing module 107 may coordinate the flow of the baggage from one waypoint to the next waypoint until the baggage arrives at the final destination. The routing module 107 may coordinate the details for transporting the baggage to each destination in the scheduled itinerary, at the scheduled time slot. For instance, the routing module 107 may reserve space for the baggage on one or more transporting vehicles utilized for transporting the baggage from the point of origin to each waypoint and eventually the final destination.

In some instances, the baggage may not remain on the same transporting vehicle throughout the entire duration of travel to the final destination. It may be common for the baggage to change transporting vehicles at one or more of the waypoints. At each waypoint, baggage may merge or disembark from the transporting vehicles in accordance with the routing patterns created by the routing module 107. The routing pattern created by the routing module 107 may identify and present, in detail, the journey scheduled for the baggage to complete in order to arrive at the final destination. The routing patterns created may include the identification of departure points such as a gate or terminal, transportation vehicle identification numbers, the arrival/departure times of the transportation vehicle as well as the destination of the transporting vehicle.

Embodiments of the routing patterns created by the routing module 107 may describe to the personnel and automated machinery of the transportation company when the baggage should be removed from the current transporting vehicles in order to be placed in route to a different transporting vehicle. The routing pattern may provide directives, departure locations and scheduling deadlines for personnel and machinery handling the baggage to follow. Changes to the transporting vehicles may be quite common when the transportation company is an airline, train company, bussing company or even a boating company. For example, it may be common for the baggage to change flights periodically at waypoints comprising intermediary airports. The baggage may be unloaded from the first flight at the current waypoint, in accordance with the routing instructions and placed on the next flight to be transported to the next waypoint or final destination. Baggage having a specified routing pattern may be removed from the first airplane and be logged into the system 100 as having arrived at the specified waypoint at a particular time. As the baggage is transported or loaded onto the second airplane, the transportation company may subsequently log the baggage as being placed on the departing vehicle.

In some embodiments, the routing module 107 may further assign baggage to one or more chaperone devices 123 responsible for accompanying groups of baggage to each waypoint or final destination in itinerary prepared by the itinerary module 105. Each of the chaperone devices 123 may have a set destination or route. Along the routing path of the chaperone device 123, baggage may be added, transferred or removed from the baggage group of a particular chaperone device 123 in accordance with each bags routing pattern. The chaperone device 123 may be responsible for identifying when the additions, transfers or removals of baggage from the baggage group are legitimate and whether or not the changes to the group's composition is improper and thus should be reported. In some embodiments, the baggage's unique identification number may be registered with the chaperone device 123 via the routing module 107. The routing module 107 may indicate to the chaperone device 123 one or more properties of the baggage, including the make, model, size, weight, color, shape, length of travel in the baggage group, baggage owner information and the departure/arrival times of the baggage while the baggage is part of the chaperone device's 123 baggage group.

In some embodiments of the baggage system 100, the chaperone device 123 may appear to resemble a piece of luggage, but may in fact be monitoring each of the pieces of baggage registered with the chaperone device 123. Groups of luggage may be gathered together and organized based on the final destination or waypoint scheduled in each itinerary. Baggage having common destinations or routing patterns that overlap may travel together in the same baggage group for some or part of the baggage's' journey to each bags' respective final destination. To monitor the integrity of the baggage group, the chaperone devices 123 may be embedded within the collection of baggage to monitor each piece of baggage and alert the master baggage system 101 if one or more pieces of baggage registered in the baggage group is missing or has not arrived on time.

In some embodiments, the chaperone devices 123 may include both hardware and/or software techniques for tracking each piece of baggage within the assigned baggage group. The chaperone devices 123 may track the proximity and presence of each piece of assigned baggage. For example, chaperone devices 123 may include proximity sensors and/or object recognition cameras loaded with information describing each piece of baggage in the group and the baggage's itinerary. In the event that a piece of baggage is removed from the group prematurely, before arriving at the scheduled destination or waypoint, the chaperone device 123 may detect the removal of the baggage, compare the removal time with the scheduled time the baggage should be removed from the group and alert the master baggage system 101 if there is an inconsistency. Likewise, baggage that merges into the group at one or more destinations may also be flagged by the chaperone device 123 and reported to the master baggage system 101, if the merger is incorrect. Baggage that has been improperly added to a baggage group may be symptomatic of missing luggage that should be currently in a different baggage group handled by a separate chaperone device 123. The master baggage system 101 may cross reference chaperone device 123 notifications reporting missing baggage with chaperone device 123 notifications reporting improperly received baggage that has not been assigned to the chaperone device's 123 baggage group, allowing for the master baggage system to identify the improperly handled baggage and correct the routing pattern.

In some embodiments of the baggage system 100, the master baggage system 101 may rely on the chaperone devices 123 to report missing pieces of baggage that may have improperly left the chaperone's group during travel. The master baggage system 101 may receive period updates from the chaperone devices 123 indicating the departure and arrival of each baggage group to the scheduled destinations. Upon arriving or departing a location, the chaperone devices 123 may transmit a status update over network 120 to the master baggage system 101. The master baggage system 101 receiving the status update, may synchronize the current status of a customer's baggage belonging in a chaperone device's 123 group that has reported an arrival or departure. The master baggage system 101 may update the routing pattern and itinerary of the baggage to accurately reflect the baggage's location.

In some embodiments, the baggage module 103 may further comprise a tracking module 109. The tracking module 109 may send and receive communication from one or more tracking devices 125 monitoring the location and status of the baggage being transported by the commercial transportation company. Tracking devices 125 may be affixed to the baggage in some embodiments. The tracking devices 125 may communicate over the network 120 to the master baggage system 101 directly in some embodiments or external components strategically placed along the routing pattern. For example, detectors may be positioned along terminals and transportation hubs allowing for the receipt of a signal emitted by the tracking device 125 as the baggage passes through the hub or terminal. As the tracking device passes a receiver, the tracking device 125 may "check in" with the receiver and identify the baggage associated with the tracking device 125. Subsequently, the receiver receiving the emitted signal from the tracking device 125 may report the presence of the baggage to the master baggage system 101, the unique identifier associated with the baggage and the time that the tracking device interacted with the receiver. Monitoring the tracking device's 125 location via fixed receivers may be beneficial for confirming that the baggage is following the itinerary and meeting the itinerary deadlines established by the itinerary module 105.

Alternatively in other embodiments the tracking devices 125 may not be monitored by receiving devices placed throughout the terminals or locations of the commercial transportation company. Instead, the tracking device 125 may interface with the chaperone devices 123. The chaperone devices may synchronize, scan or communicate with the tracking device 125 in order to identify and maintain a close proximity to the baggage within the chaperone device's group. The chaperone device 123 receiving communications from each tracking device 125 affixed to the baggage may report the presence or absence of the baggage to the master baggage system 101 via the tracking module 109.

Embodiments of the tracking device 125 may include passive or active communication devices. Examples of a passive communication device may include passive tags, RFID tags, scan-able bar codes or QR codes. Passive tracking devices may not include an internal power source, but instead may be powered by electromagnetic energy being transmitted to the passive tracking device. For instance, when using a passive RFID tag affixed to the baggage, the passive RFID tag may comprise an antenna and a microchip or integrated circuit. An RFID reader may be integrated into the chaperone device 123 or placed in various locations along the transportation route of the baggage. As the passive RFID tag comes within a certain distance to the RFID reader, the information about the baggage, including the baggage itinerary, routing pattern and the unique identifying number of the baggage may be provided to the RFID reader. The reader may relay the information to the tracking module 109, which may subsequently synchronize the current position of the baggage to reflect the interaction with the RFID reader tracking the movement of the baggage.

Similar to the passive RFID tags, when bar codes or QR codes are affixed to the baggage, a bar code scanning device may be equipped on the chaperone device 123 or placed at various points along the transportation route of the baggage. The bar code or the QR codes may be scanned by the scanning device during the arrival or departure of the baggage from a particular location along the transportation route. Moreover, the chaperone device 125 may scan new sets of baggage merging into the baggage group or leaving the baggage group at various waypoints. The chaperone device 123 may scan the baggage and confirm with the master baggage system 101 that the baggage is in the proper location or properly departing from the group in accordance with the scheduled itinerary and routing pattern.

In some embodiments of the tracking device 125, the tracking device 125 connected to the network 120 may be an active tracking device such as an active RFID tag, near field communication (NFC) device, a beacon or sensor emitting a signal. Similar to the passive tracking device, an active tracking device may be affixed to the baggage and contain information loaded in the memory of the tracking device 125, including characteristics of the baggage, the baggage itinerary and the routing pattern. Active RFID tags, sensors and beacons may be battery powered or contain an external power source to broadcast a signal to the chaperone device 123 or a receiver positioned at various locations along the routing pattern. Active RFID or sensor beacons may be more desirable in some embodiments because the external power source may increase the distance each of the tracking devices 125 may be recognized from. As the active tracking device 125 comes into proximity with the receiver or chaperone device 123, the emitted signal of the tracking device 125 may be received by the receiver or chaperone device 123 and identified as belonging to a particular piece of baggage. The receiver communicating with the tracking device 125 may report the communication with the tracking device 125, including the location of the receiver or chaperone device 123, the time of the interaction and the identifying information of the baggage. The corresponding communication may be cross referenced with the baggage's itinerary and routing pattern to ensure that the baggage is present in the proper location.

Embodiments of the baggage module 103 may, in some embodiments, further comprise a verification module 111. The verification module 111 may communicate with a verification system 127 connected to the master baggage system 101 via the network 120. The verification system 127 may be capable of recording and documenting the location of baggage along the scheduled routing pattern, including arrival and departures of the baggage. A verification system 127 may collect visual data describing the locations, arrivals and departures of baggage from various locations along the routing patterns established by the routing module 107. Verification systems 127 may be positioned along the routes controlled or operated by the transportation company including transportation hubs, terminals and stations. In some embodiments, verification systems 127 may allow for an extra layer of security in addition to chaperone devices 123 and the tracking devices 125, allowing for the baggage system to visually verify the location of the baggage as it travels along the routing pattern established by the baggage system 100.

Embodiments of the verification systems 127 may include camera systems that may visually record baggage moving along from location to location on the baggage's journey to the final destination. Verification systems 127 may work in concert with the chaperone devices 123 and/or tracking devices 125 to record and tag the arrivals or departures of baggage at specific points of the baggage itinerary. Verification systems 127 may recognize chaperones 123 as the chaperones 123 pass a recording device connected to a verification system 127. The verification system 127 may interface with the chaperone devices 123 and record the movement of the chaperone device 123 along with the group of luggage accompanying the chaperone device 123. The verification system 127 may record the arrival or departure of the baggage accompanying the chaperone device, and transmit the visual data of the chaperone device 123 and the accompanying group of baggage to the master baggage system 101. The transmission from the verification system may include identifying information such as the date, time and location of the verification system 127 capturing the arrival or departure. The visual data from the verification system 127 may be received by the verification module 111, organized and stored for later use. In particular, the visual data provided by the verification system 127 may be utilized to confirm the arrival or departure of baggage, or to verify the presence or absence of misplaced baggage. In some embodiments, the recorded visual data may be accessible by the customer's client device 129.

In alternative embodiments of the baggage system 100, the verification system 127 may be strategically placed near a receiver communicating with a tracking device 125. For instance an RFID reader or barcode scanner. The verification system 127 may simultaneously or near simultaneously record and identify the baggage communicating with the receiver of the tracking device 125. For example, as the baggage containing a tracking device 125 thereon passes through a barcode scanner or comes into contact with an RFID reader, the verification system 127 may be alerted by the verification module 111. Once alerted, the verification system 127 may begin recording the arrival or departure of the baggage at the location of the receiver, along with the date, time and location information and transmit the collected data to the master baggage system 101. Visual data collected by the verification system 127 may not only assist with identifying the location of the baggage as it travels along the routing pattern, but the visual data may also assist with baggage handling quality control, identifying damage that may occur to the baggage and for verifying that security protocols are being adhered to by the employees of the transportation company.

In some embodiments of the baggage system 100, the baggage module 103 may further comprise an exceptions module 113. An exceptions module 113 may identify and catalog each error that occurs in the handling of the baggage, identifies the cause of the handling error and rectifies the error to ensure that the baggage arrives at the scheduled final destination in a timely manner. Examples of exceptions that may result in errors which can alter an itinerary or routing pattern may include (but are not limited to) missed flights, trip changes, delays, reroutes, no-shows, special requests and combinations thereof.

In some embodiments of the system 100, an exception may be identified by the exceptions module 113 as the result of an anomaly in the flow of the baggage from location to location along the routing pattern. The exceptions module 113 may receive updates from itinerary module 105, routing module 107, tracking module 109 and verification module 111 in order to compare the current status of the baggage with the proposed itinerary and routing pattern established by the baggage module 103. A failure of the baggage to arrive at a scheduled waypoint or the final destination of the baggage on time may initiate the exception module to begin locating the baggage and identifying the source of the exception. The exceptions module 113 may work backward from the last known piece of data about the baggage to determine where the baggage may have been mishandled as well as the current location of the baggage. For example, the exceptions module may review communications from the chaperone device 123, tracking device 125 and the verification system 127 in reverse chronological order to identify the last known verified location of the baggage.

In some embodiments of the baggage system 100, the exceptions module 113 may include an inference engine 115. An inference engine 115 may refer to one or more tools that apply logical rules to a knowledge base in order to draw conclusions. In the current application, the knowledge base from which the inference may use to draw conclusions may include the location information of the baggage group assigned to the chaperone device 123, the presence or absence of the baggage as reported by the chaperone device, tracking information collected by the tracking module 109 and visual data collected by the verification system 127. By analyzing the data collected by the chaperone device 123, tracking device 125, verification system 127 in relation to the itinerary and routing pattern, the inference engine 115 may be able to backtrack from the point in time from which a piece of baggage may be identified as missing or mishandled. The inference engine 115 may analyze the chaperone groups for indication of missing or improperly merging baggage, identify mis-scanned baggage that may have been flagged by the tracking module 109 or routing module 107 as being at an improper arrival or departure terminal and review visual data at possible points of mishandling to verify the baggage as being the baggage that has deviated from the routing pattern and itinerary.

In some embodiments, the exceptions module 113 may not only identify the exceptions and locate the mishandled baggage, but the exceptions module 113 may communicate with the routing module 107 to re-route the baggage to the proper final destination. The exceptions module 113 may request the itinerary module 105 to query the current transportation vehicle schedule and replot a new routing pattern in accordance with the current location of the baggage identified by the exceptions module 113.

Embodiments of the baggage system 100 may further include a reporting module 117. The reporting module 117 may perform multiple reporting functions. Firstly, embodiments of the reporting module may output baggage information, including the itinerary, routing pattern, current location, visual data and any reported exceptions to an output device such as display device 121 via an input/output (I/O) interface 118. Administrators and users of the master baggage system 101 may visually observe the data collected and updated by the baggage module 103. Administrators and users of the master baggage system 101 may, in some embodiments make manual adjustments to the baggage itinerary and routing pattern of the baggage by inputting data into the master baggage system 101.

Moreover, in some embodiments, the reporting module 117 may report the current status and location of the customer's baggage to a customer's client device 129, capable of connecting to the master baggage system 101 or a server receiving data from the master baggage system 101. Examples of a client device may include, but is not limited to, a personal computer, mobile computing device, smartphone, cell phone, table computer, laptop computer, internet enabled device or other computing system capable of connecting to network 120. A client device 129 connecting to network 120 may request and download up to date information about the customer's baggage as the baggage information is received by the master baggage system 101. The client device 129 may review the routing pattern of the baggage, observe visual verification data of the baggage arriving at scheduled waypoints and even receive push notifications or alerts as the baggage arrives at each waypoint. In some embodiments, the client device 129 may further receive alerts and reports when an exception may occur to the baggage itinerary that may cause a delay in the baggage arriving at the final destination on time.

Method for Transporting Baggage

Figure 2:
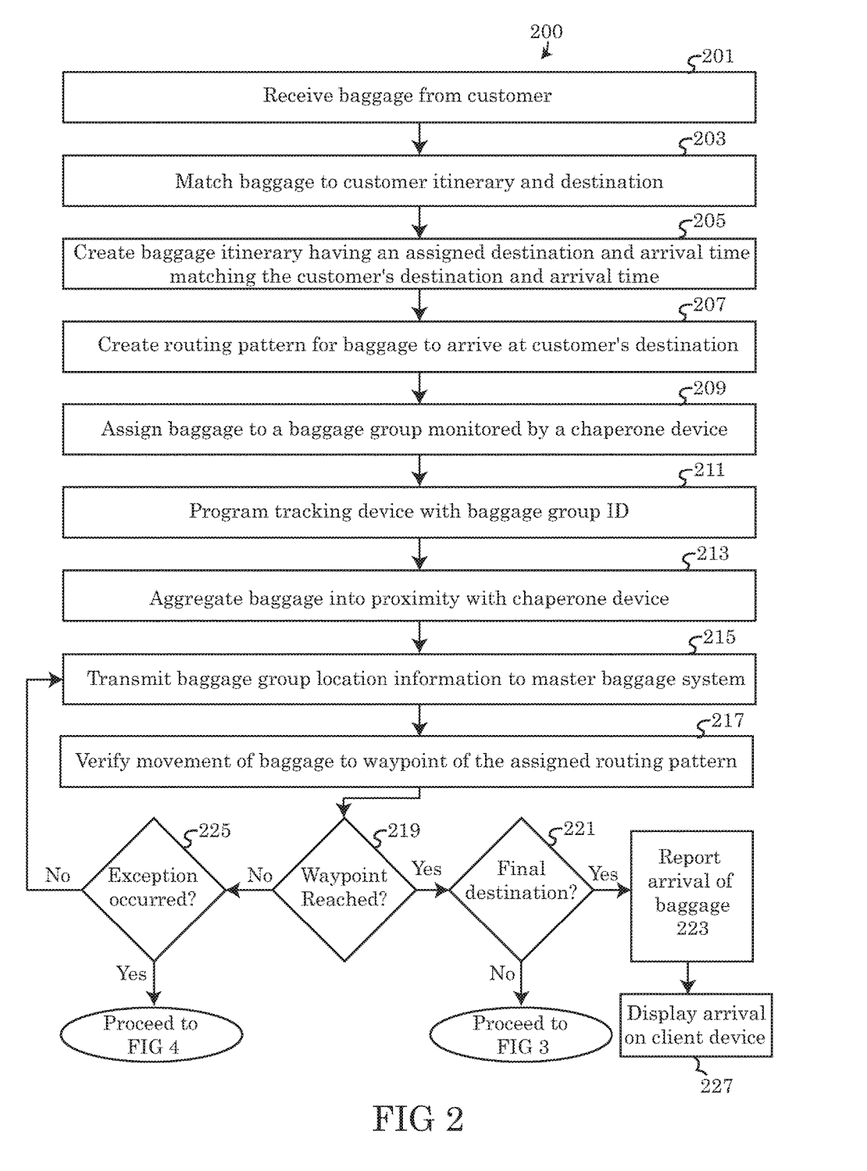
FIG. 2 depicts an embodiment of algorithm for transporting baggage.
Figure 3:
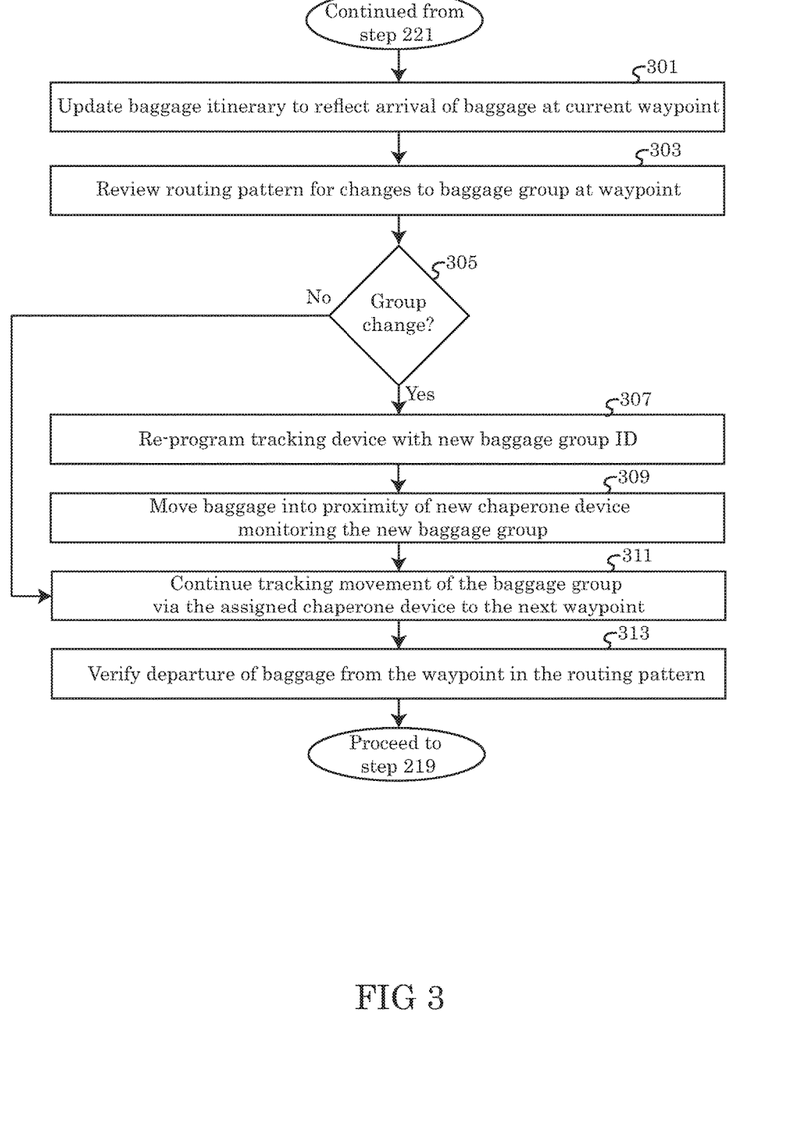
FIG. 3 depicts a continuation of the embodiment of the algorithm for transporting baggage of FIG. 2.
Figure 4:
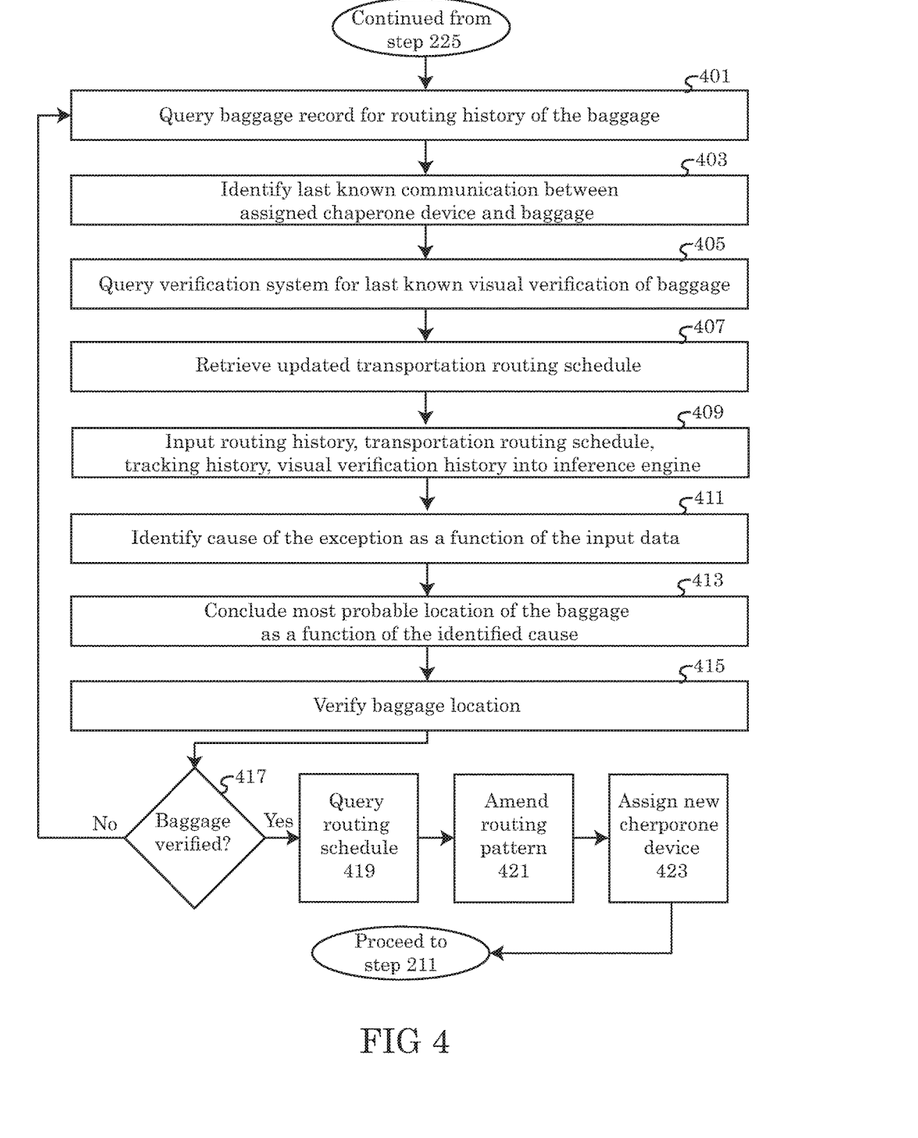
FIG. 4 further depicts a continuation of embodiment of the algorithm for transporting baggage of FIG. 2.

The drawing of FIGS. 2-4 represent an embodiment of a method or algorithm that may be implemented for transporting baggage in accordance with the baggage systems 100 described in FIG. 1 using one or more computers as defined generically by FIG. 5 below, and more specifically by the embodiments of specialized computer systems 101, 123, 125, 127, 129 presented in FIG. 1. A person skilled in the art should recognize that the steps of the algorithm described in FIGS. 2-4 may be performed in a different order than presented by FIGS. 2-4 and the algorithm may not require all of the steps described herein to be performed. Rather, some embodiments may transport baggage using only one or more of the steps discussed below.

The embodiment of the method 200 for transporting baggage may begin at step 201. In step 201, the transportation company may receive the baggage from the customer. The transferal of the baggage from the customer to the transportation company may occur at a hub, terminal or a regular place of business operated by the transportation company. In step 203 of the method, the transportation company may match the baggage to the customer's travel itinerary, including the final destination of the customer. The step of matching or pairing the baggage to the customer may be performed by linking the customer's itinerary to the baggage, scanning a customer's ticket or manually entering the customer's information into the baggage system 100.

In step 205, the system 100 may create a baggage itinerary as a function of matching the baggage to the customer's itinerary and destination. The baggage itinerary created by the itinerary module 105 may include the assignment of a final destination and an arrival time for the baggage at the final destination that matches or is significantly close to the arrival of the customer. In some embodiments, the itinerary created in step 205 may further include any waypoints the baggage may stop or transfer from to the final destination and the associated times the baggage may be present at each particular waypoint. In step 207 of the disclosed method for transporting baggage, the routing module 107 may create a routing pattern for the baggage to arrive at the final destination of the itinerary of step 205. The routing pattern created by the routing module 107 may provide travel details for the routing the baggage from the starting location to the final destination, including one or more waypoints, gates, terminals, transfer points, times, transportation vehicle numbers, etc.

In step 209 of the disclosed method, the system 100 and more particularly the routing module 107 may further assign each piece of baggage to a baggage group that may be monitored by a chaperone device 123 for each stretch of the bag's journey to the final destination. The baggage groups may each have pre-programmed routes determined by the master system 101. The routing module 107 may compare each of the routes with the itinerary created in step 205 and determine a path for transporting the baggage to the final destination using the available baggage groups and the baggage groups' pre-programmed routes. Once the baggage is assigned to the chaperone devices, in step 211 each piece of baggage may be equipped with a tracking device 125 affixed to the exterior of the baggage and the tracking device 125 may be programmed with a baggage group ID. The baggage group ID may identify the baggage as belonging to a particular baggage group and a particular chaperone 123 that may be in charge of monitoring the group. The tracking device 125 may contain credentials of the baggage, including the routing pattern and itinerary information which may be accessible to the chaperone device via electronic communication over the network 120.

Once each of the pieces of baggage has been programmed or assigned a baggage group ID, in step 213, the baggage may be aggregated into the proximity of the chaperone device 123. The performance of step 213 may be an automated process, whereby machines, conveyer belts and other systems integrated into the transportation company's hubs or terminals may sort the baggage according to group. In alternative embodiments, the baggage may be manually viewed, scanned and/or sorted according to baggage group, wherein luggage from the same groups may be positioned in the same proximity, near the assigned chaperone device 123. Subsequently, after assembling the baggage groups together, the entire group, including the chaperone device 123 may be loaded onto a transporting vehicle tasked with moving the baggage group from the current location to the next waypoint or final destination. In step 215, the baggage group may transmit the baggage group location to the master system 101. The location of the baggage group may be reported as a function of the chaperone device 123, the tracking device 125 affixed to the baggage, or a combination of systems thereof. Furthermore, in some embodiments of the method, in step 217 the verification system 127 may further verify the movement of the baggage from the current location to the next waypoint or final destination. The verification system 127 may record the movement of the baggage and/or baggage group to the point of departure from the drop off location in step 201 via the transportation vehicle.

In step 219, the system 100 may make a determination of whether or not the baggage has arrived at the first waypoint. The master system 101 may compare the current time to the timing of the scheduled itinerary and determine if the baggage and/or the chaperone 123 of the baggage group has arrived at the waypoint within the original itinerary's time slot. The master system 101 may review the data collected by the routing module 107, the tracking module 109 and the visual data of the verification module 111. Upon reviewing the current status of the baggage, master system 101 may determine whether or not the baggage has arrived at the waypoint in step 219 as a function of the data collected by the baggage module 103. If the data collected by the master system 101 indicates that the baggage has arrived at the waypoint, the method may proceed to step 221.

In step 221 the master system 101 may further assess whether the baggage has arrived at the bag's final destination. Step 221 may be performed by reviewing the current location of the baggage as a function of the data collected from the routing module 107, tracking module 109 and the verification module 111 and comparing the collected data with the final destination of the itinerary. If it is determined by the master system 101 that the current location of the baggage matches the final destination of the itinerary, the final destination has been met. The master system 101 may proceed to update the itinerary and routing pattern to reflect the arrival of the baggage and report via the reporting module 117 the status of the baggage in step 223. Moreover, in step 227, the reporting module 117 may further transmit the arrival information of the baggage at the final destination to the client device 129, informing the customer of the arrival of the baggage at the final destination.

If however, in step 221 the current location of the baggage as reported by the routing module 107, tracking module 109 and the verification module 111 do not indicate the baggage has arrived at the final destination, the system 100 may continue to route the baggage to the final destination as per the routing pattern established by the routing module 107. Embodiments of the method 200 may proceed to step 301 whereby the baggage itinerary and routing pattern may be updated to properly reflect the arrival of the baggage at the current way point, as determined in step 219 and 221. In some embodiments, the update to the baggage itinerary in step 301 may be further transmitted to the client device 129 via email, short messaging service (SMS), direct messaging, push notification or other messaging means for alerting the customer of the baggage's current status.

In step 303 of the described method for transporting baggage, the baggage module 103 via the routing module 107 may review the routing pattern initially established to determine if a change to the baggage group may occur at the current waypoint needs to occur to comply with the routing pattern. If, in step 305 the baggage module 103 identifies that a baggage group change is not scheduled to occur at the current waypoint, the system 100 may leave the baggage in the current baggage group and continue to track the movement of the baggage group via the current chaperone device 123. However, on the other hand, if a baggage group change is scheduled to be performed at the current waypoint, the baggage may be separated from the current baggage group and the associated chaperone 123. The baggage, in step 307 may have the affiliated tracking device 125 re-programmed with the new baggage group ID and credentials affiliated with the new group. The baggage may be subsequently transported in step 309 by moving the baggage into the proximity of the new chaperone device 123 responsible for monitoring the group.

In step 311, the baggage, the associated baggage group assigned to the baggage and the chaperone device 123 may be continuously tracked as the baggage group and the chaperone device 123 commence moving to the next waypoint or final destination. The chaperone device 123 may continue to monitor the bags in the affiliated group, while the tracking module 125 and the verification system also continue to track the location of the baggage and the baggage group. In step 313, the system 100 may verify the departure of the baggage from the current waypoint and confirm whether or not the baggage being tracked has been accounted for. The baggage module 103 may verify via reports received from the chaperone device 123, tracking device 125 and verification system 127 that the baggage has been properly transported from the current waypoint to the next transportation vehicle. The method may subsequently return to step 219 as discussed wherein the system 100 may to verify the arrival of the baggage at the next waypoint.

Conversely, if in step 219, the system 100 makes the determination that the baggage has not arrived at the waypoint, the method 200 may continue on to step 225. In step 225, the system 100 may further identify whether or not an exception to the routing pattern has occurred resulting in the delay or mishandling of the baggage and thus preventing the baggage from reaching a scheduled destination or waypoint at the time slot scheduled in the itinerary. If the routing pattern has not experienced an exception, the system 100 may continue transmit and receive updated baggage location information as the baggage continues to travel to the next waypoint. However, if the system 100 has determined that an exception has occurred, the method may proceed to step 401.

Once the exceptions module 113, has identified the occurrence of an exception to the routing pattern, the exceptions module 113 may proceed to identify the cause of the exception, locate the baggage and re-direct the baggage to the final destination. In step 401, the exceptions module 113 may query the baggage records stored by the master baggage system 101 for the routing history of the baggage. The exceptions module 113 may in step 403 identify the last know communication between the assigned chaperone device and the baggage. The exceptions module may retrieve the communication data from the chaperone device 123 or query the routing module for the communication information. The chaperone device 123 data may indicate the last known date, time and location that the baggage was in proximity to the chaperone device 123 and the assigned baggage group.

In step 405, the exceptions module 113 may also query the verification system 127 and/or the verification module 111 to identify the last known or recorded visual data verifying the location of the baggage and use the stored or collected data to pinpoint the most probable location of the missing or mishandled baggage. The exceptions module may, in step 407 further retrieve an updated transportation routing schedule describing each of the possible routes the baggage may be corrected to once the cause of the exception is identified and the location of the baggage is pinpointed. In step 409, the queried routing history, chaperone communication history, updated transportation routing schedule, tracking history and visual verification history may be inputted into the inference engine 115 of the exceptions module.

As a function of the data inputted into the inference engine 115, the inference engine 115 may in step 411 identify the cause of the exception as a function of the input data provided by each component and module of the baggage system 100. Based on the identified exception, the inference engine 115 may in step 413, further conclude the most probable location of the baggage based on the exception's cause. For example, if the cause was caused by the baggage missing the departure of the transportation vehicle, the location of the baggage would most likely be the waypoint at which the baggage failed to reach the transportation vehicle on time. In step 415, the verification system 127 may engage the camera systems located at the most probably location wherein the baggage may reside to confirm that the baggage is indeed present as predicted.

In step 417, the baggage system 100 may make a determination whether or not the visual data collected by the verification system 127 has verified the location of the baggage. If in step 417, the baggage cannot be verified by the verification system 127, the method may return to step 401, re-evaluate the evidence collected by the exceptions module 113 and calculate the next most probable location for the baggage to reside. Conversely, once the location of the baggage is confirmed, the baggage system 100 may query the routing schedule in step 419, amend the routing pattern in step 421 in order to adjust the route that the baggage will take from the current location to the final destination. The routing module 107 may use the queried routing schedule to assign the baggage to one or more transportation vehicles that may be available to transport the baggage to the next waypoint or destination in the itinerary. Once the amended routing pattern has been prepared, the routing module 107 may, in step 423 assign a new chaperone device 123 programmed for the routing pattern, to accompany the baggage assigned to the baggage group on the bag's journey toward the final destination. The method may subsequently proceed back to step 211 and follow the method as described above, starting from the baggage's current location, until the final destination is achieved.

Computer System

Referring to the drawings, FIG. 5 illustrates a block diagram of a computer system 500 that may be included in the systems of FIG. 1 and for implementing methods for transporting baggage as shown in the embodiment of FIGS. 2-4 and in accordance with the embodiments described in the present disclosure. The computer system 500 may generally comprise a processor 591, otherwise referred to as a central processing unit (CPU), an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for tools and programs for transporting baggage, in the manner prescribed by the embodiments of the disclosure using the systems of FIGS. 1-4 wherein the instructions of the computer code 597 may be executed by processor 591 via memory device 595. The computer code 597 may include software or program instructions that may implement one or more algorithms for implementing the methods for transporting baggage, as described in detail above. The processor 591 executes the computer code 597.

Processor 591 may include a single processing unit, or may be distributed across one or more processing units in one or more locations (e.g., on a client and server).

The memory device 594 may include input data 596. The input data 596 includes any inputs required by the computer code 597, 598. The output device 593 displays output from the computer code 597, 598. Either or both memory devices 594 and 595 may be used as a computer usable storage medium (or program storage device) having a computer readable program embodied therein and/or having other data stored therein, wherein the computer readable program comprises the computer code 597, 598. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597, 598) in order to reduce the number of times code must be retrieved from bulk storage while instructions of the computer code 597, 598 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in the figures.

In some embodiments, rather than being stored and accessed from a hard drive, optical disc or other writeable, rewriteable, or removable hardware memory device 594, 595, stored computer program code 598 (e.g., including algorithm) may be stored on a static, non-removable, read-only storage medium such as a Read-Only Memory (ROM) device 599, or may be accessed by processor 591 directly from such a static, non-removable, read-only medium 599. Similarly, in some embodiments, stored computer program code 597 may be stored as computer-readable firmware 599, or may be accessed by processor 591 directly from such firmware 599, rather than from a more dynamic or removable hardware data-storage device 595, such as a hard drive or optical disc.

In some embodiments, the computer system 500 may further be coupled to an Input/output (I/O) interface and a computer data storage unit (for example a data store, data mart or repository). An I/O interface may include any system for exchanging information to or from an input device 592 or output device 593. The input device 592 may be, inter alia, a keyboard, a mouse, sensors, beacons, RFID tags, microphones, biometric input device, camera, timer, etc. The output device 593 may be, inter alia, a printer, a plotter, a display device (such as a computer screen or monitor), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

The I/O interface may allow computer system 500 to store information (e.g., data or program instructions such as program code 597, 598) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that controls the transportation of baggage, to deploy or integrate computing infrastructure with respect to tracking and monitoring the transportation of baggage. Thus, an embodiment of the present invention discloses a process for supporting computer infrastructure, where the process includes providing at least one support service for at least one of integrating, hosting, maintaining and deploying computer-readable code (e.g., program code 597, 598) in a computer system (e.g., computer 500) including one or more processor(s) 591, wherein the processor(s) carry out instructions contained in the computer code 597 causing the computer system to transporting baggage. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for transporting baggage. Thus the present invention discloses a process for supporting, deploying and/or integrating computer infrastructure, integrating, hosting, maintaining, and deploying computer-readable code into the computer system 500, wherein the code in combination with the computer system 500 is capable of performing a method of transporting baggage.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transporting baggage comprising the steps of:
   creating, by a processor of a computer system, a baggage itinerary comprising a waypoint, a final destination and arrival times for the baggage at the waypoint and final destination;
   assigning, by the processor, a routing pattern to the baggage;
   further assigning, by the processor, the baggage to a baggage group comprising a chaperone device configured to escort the baggage to the waypoint or final destination, wherein said chaperone device comprises an object recognition camera identifying the baggage relative to a location of the chaperone device and object recognition software loaded with information describing the baggage;
   receiving, by the processor, the location of the baggage group from the chaperone device tracking the location of the baggage relative to the chaperone device; and
   retrieving, by the processor, visual verification data from a verification system positioned at the waypoint or final destination, visually recording an arrival or absence of the baggage and the chaperone device at the waypoint or final destination.

2. The method of claim 1, further comprising the step of:
   programming, by the processor, a tracking device affixed to the baggage with a baggage group ID number corresponding to the assigned baggage group; and
   receiving, by the processor, a position of the baggage in relation to the chaperone device via the tracking device.

3. The method of claim 2, wherein the tracking device is selected from a group consisting of passive tags, active tags and sensors.

4. The method of claim 1, further comprising the steps of:
   receiving, by the processor, visual verification data from the verification system indicating the arrival of the baggage at the waypoint;
   updating, by the processor, the baggage itinerary to indicate the arrival of the baggage at the waypoint;
   querying, by the processor, the routing pattern of the baggage for changes in the assigned baggage group;
   reassigning, by the processor, the baggage to a new baggage group at the waypoint comprising a new chaperone device.

5. The method of claim 1, further comprising the steps of:
   receiving, by the processor, the visual verification data indicating an exception to the routing pattern as a function of the absence of baggage at the waypoint or final destination at the arrival time indicated by the baggage itinerary;
   querying, by the processor, a routing history of the baggage;
   identifying, by the processor, a last known time of communication between the chaperone device and the baggage;
   querying, by the processor, the verification system for a last known visual verification of the baggage; and
   concluding, by the processor, a cause of the exception to the routing pattern and a current location of the baggage as a function of the routing history, the last known time of communication and the last known visual verification of the baggage.

6. The method of claim 5, further comprising the steps of:
   updating, by the processor, the baggage itinerary to reflect the current location of the baggage;
   re-calculating, by the processor, the routing pattern to transport the baggage from the current location to the final destination; and
   re-assign, by the processor, the baggage to a new chaperone device configured to escort the baggage from the current location.

7. The method of claim 5, wherein the cause of the exception to the routing pattern is a condition selected from the group consisting of a missed flight, no show, trip change, delay, re-route, special request and a combination thereof.

8. The method of claim 1, further comprising providing at least one support service for at least one of creating, integrating, hosting, maintaining, and deploying computer-readable program code in a computer system, where the computer-readable program code in combination with the computer system is configured to implement the steps of creating, assigning, further assigning, receiving and retrieving.

9. A computer system, comprising:
   a processor;
   a memory device coupled to the processor;
   a chaperone device comprising an object recognition camera loaded with object recognition software;
   a visual verification system; and
   a non-transitory computer readable storage medium coupled to the processor, wherein the non-transitory computer readable storage device contains program code executable by the processor via the memory device to implement a method for transporting baggage comprising the steps of:
      creating, by the processor, a baggage itinerary comprising a waypoint, a final destination and arrival times for the baggage at the waypoint and final destination;
      assigning, by the processor, a routing pattern to the baggage;
      further assigning, by the processor, the baggage to a baggage group comprising the chaperone device configured to visually identify the baggage relative to a location of baggage group and the chaperone device through the object recognition camera and escort the baggage to the waypoint or final destination;
      receiving, by the processor, the location of the baggage group from the chaperone device tracking the location of the baggage relative to the chaperone device; and
      retrieving, by the processor, visual verification data from a verification system positioned at the waypoint or final destination, visually recording an arrival or absence of the baggage and the chaperone device at the waypoint or final destination.

10. The system of claim 9, further comprising the step of:
    programming, by the processor, a tracking device affixed to the baggage with a baggage group ID number corresponding to the assigned baggage group; and
    receiving, by the processor, a position of the baggage in relation to the chaperone device via the tracking device.

11. The system of claim 10, wherein the tracking device is selected from a group consisting of passive tags, active tags and sensors.

12. The system of claim 9, further comprising the steps of:
   receiving, by the processor, visual verification data from the verification system indicating the arrival of the baggage at the waypoint;
   updating, by the processor, the baggage itinerary to indicate the arrival of the baggage at the waypoint;
   querying, by the processor, the routing pattern of the baggage for changes in the assigned baggage group;
   reassigning, by the processor, the baggage to a new baggage group at the waypoint comprising a new chaperone device.

13. The system of claim 9, receiving, by the processor, visual verification data indicating the absence of baggage at the waypoint or final destination at the arrival time indicated by the baggage itinerary;
   querying, by the processor, a routing history of the baggage;
   identifying, by the processor, a last known time of communication between the chaperone device and the baggage;
   querying, by the processor, the verification system for a last known visual verification of the baggage;
   concluding, by the processor, a cause of an exception to the routing pattern and a current location of the baggage as a function of the routing history, the last known time of communication and the last known visual verification of the baggage;
   updating, by the processor, the baggage itinerary to reflect the current location of the baggage;
   re-calculating, by the processor, the routing pattern to transport the baggage from the current location to the final destination; and
   re-assign, by the processor, the baggage to a new chaperone device configured to escort the baggage from the current location.

14. The system of claim 13, wherein the cause exception to the routing pattern is a condition selected from the group consisting of a missed flight, a no show, a trip change, a delay, a re-route, a special request and a combination thereof.

15. A computer program product comprising:
   one or more non-transitory computer readable storage mediums having computer readable program code stored therein, said program code containing instructions executable by one or more processors to implement a method for transporting baggage comprising the steps of:
   creating, by a processor, a baggage itinerary comprising a waypoint, a final destination and arrival times for the baggage at the waypoint and final destination;
   assigning, by the processor, a routing pattern to the baggage;
   further assigning, by the processor, the baggage to a baggage group comprising a chaperone device configured to escort the baggage to the waypoint or final destination, wherein said chaperone device comprises an object recognition camera identifying the baggage relative to a location of the chaperone device and object recognition software loaded with information describing the baggage;
   receiving, by the processor, the location of the baggage group from the chaperone device tracking the location of the baggage relative to the chaperone device; and
   retrieving, by the processor, visual verification data from a verification system positioned at the waypoint or final destination, visually recording an arrival or absence of the baggage and the chaperone device at the waypoint or final destination.

16. The computer program product of claim 15, further comprising the step of:
   programming, by the processor, a tracking device affixed to the baggage with a baggage group ID number corresponding to the assigned baggage group; and
   receiving, by the processor, a position of the baggage in relation to the chaperone device via the tracking device.

17. The computer program product of claim 16, wherein the tracking device is selected from a group consisting of passive tags, active tags and sensors.

18. The computer program product of claim 15, further comprising the steps of:
   receiving, by the processor, visual verification data from the verification system indicating the arrival of the baggage at the waypoint;
   updating, by the processor, the baggage itinerary to indicate the arrival of the baggage at the waypoint;
   querying, by the processor, the routing pattern of the baggage for changes in the assigned baggage group;
   reassigning, by the processor, the baggage to a new baggage group at the waypoint comprising a new chaperone device.

19. The computer program product of claim 15, receiving, by the processor, visual verification data indicating the absence of baggage at the waypoint or final destination at the arrival time indicated by the baggage itinerary;
   querying, by the processor, a routing history of the baggage;
   identifying, by the processor, a last known time of communication between the chaperone device and the baggage;
   querying, by the processor, the verification system for a last known visual verification of the baggage;
   concluding, by the processor, a cause of an exception to the routing pattern and a current location of the baggage as a function of the routing history, the last known time of communication and the last known visual verification of the baggage;
   updating, by the processor, the baggage itinerary to reflect the current location of the baggage;
   re-calculating, by the processor, the routing pattern to transport the baggage from the current location to the final destination; and
   re-assign, by the processor, the baggage to a new chaperone device configured to escort the baggage from the current location.

20. The computer program product of claim 19, wherein the cause exception to the routing pattern is a condition selected from the group consisting of a missed flight, a no show, a trip change, a delay, a re-route, a special request and a combination thereof.

* * * * *